US007750597B2

(12) United States Patent
Takada et al.

(10) Patent No.: US 7,750,597 B2
(45) Date of Patent: Jul. 6, 2010

(54) POWER SUPPLY APPARATUS

(75) Inventors: Masahiro Takada, Shizuoka (JP); Toshihiko Ichinose, Nara (JP)

(73) Assignee: Panasonic Corporation, Osaka (JP)

( * ) Notice: Subject to any disclaimer, the term of this patent is extended or adjusted under 35 U.S.C. 154(b) by 527 days.

(21) Appl. No.: 11/808,039

(22) Filed: Jun. 6, 2007

(65) Prior Publication Data

US 2007/0278968 A1 Dec. 6, 2007

(30) Foreign Application Priority Data

Jun. 6, 2006 (JP) ............................ 2006-157613

(51) Int. Cl.
*H02J 7/00* (2006.01)
*H01M 12/00* (2006.01)
*H01M 8/04* (2006.01)

(52) U.S. Cl. ............................ 320/101; 429/9; 429/13; 429/23

(58) Field of Classification Search .................. 307/9.1, 307/10.1, 45, 46, 52, 66, 86; 429/9, 12, 13, 429/17, 19, 21, 22, 23, 30; 320/101, 103, 320/110, 111, 140
See application file for complete search history.

(56) References Cited

U.S. PATENT DOCUMENTS 6,781,343 B1 * 8/2004 Demachi et al. ............ 320/101
7,023,107 B2 * 4/2006 Okuda et al. ............... 307/10.1
7,049,788 B2 * 5/2006 Itou .......................... 320/101
2003/0118876 A1 * 6/2003 Sugiura et al. ................. 429/9
2004/0207362 A1 * 10/2004 Kanouda et al. ............ 320/104
2006/0029846 A1 * 2/2006 Konoto et al. ................. 429/23
2006/0170390 A1 * 8/2006 Kikuchi et al. .............. 320/101

FOREIGN PATENT DOCUMENTS

JP 2005-56764 3/2005

* cited by examiner

*Primary Examiner*—Edward Tso
*Assistant Examiner*—M'Baye Diao
(74) *Attorney, Agent, or Firm*—McDermott Will & Emery LLP

(57) ABSTRACT

A power supply apparatus is provided which includes: a fuel cell; a power storage device which stores electric power; a connection terminal for connecting a load; a charge-used voltage converter which converts the output voltage of the fuel cell into a charging voltage for charging the power storage device and charges the power storage device; and an output-used voltage converter which converts the output voltage of the power storage device into a predetermined set output voltage and outputs it to the connection terminal.

13 Claims, 8 Drawing Sheets

LOAD APPARATUS
DC-DC CONVERTER
VOLTAGE SETTING PORTION
DC-DC CONVERTER
Vout2
Vin2
Vout1
Vin1
+
−
1
2
3
4
5
6
7
8
9
21
21

7
8
Vout2
5
Vref2
VOLTAGE SETTING PORTION
6
52
C2
S52
SWITCHING CONTROLLER
53
51
S51
Q4
Q3
L2
4
Vin2

S31,S51

1a
9
LOAD APPARATUS
7
8
Vout2
5
DC–DC CONVERTER
VOLTAGE SETTING PORTION
6
Vin2
4a
Vout1
3
DC–DC CONVERTER
Vin1
+
–
21
2
21

1c
LOAD APPARATUS
9
7
8
Vout2
5
DC-DC CONVERTER
VOLTAGE SETTING PORTION
6
Vin2
10
4b
Vout1
3
DC-DC CONVERTER
Vref1
13
TARGET-VOLTAGE SETTING PROCESSING PORTION
+
-
Vin1
12
FUEL SUPPLY PORTION
21
2
21

POWER SUPPLY APPARATUS

BACKGROUND OF THE INVENTION

1. Field of the Invention

The present invention relates to a power supply apparatus which includes a fuel cell.

2. Description of the Background Art

At the recent time, in portable electronic equipment such as a personal computer or an electric machine such as an electrically-driven tool, a secondary battery such as a lithium-ion battery and a nickel-hydrogen battery has been widely used as a power source. However, when such equipment is operated using a secondary battery, the equipment cannot be continuously operated long enough because of its limited battery capacity. For example, if a portable-type personal computer is operated using a secondary battery, its electric power can only be continuously supplied for four hours or so.

On the other hand, in recent years, attention has been drawn to a fuel cell which is capable of continuing to supply the power for a long time. For example, in supplying the power to a personal computer, a fuel cell is under consideration which can supply the power for twenty to forty hours without a break.

A fuel cell is configured by building in layers a single cell formed by sandwiching an electrolyte layer between an anode (−) and a cathode (+). Fuel and air are supplied to the anode and the cathode, respectively. Then, an electrochemical reaction is produced, so that electric power is generated. As such fuel, for example, hydrogen, methanol, or the like is used. As the load current rises, the output voltage of the fuel cell drops. Besides, even if the fuel supply is varied according to changes in the load current, the generated energy remains unchanged for a while after the fuel supply is varied. This time lag makes it difficult to change the generated power promptly, thus causing the output voltage to change as the load current fluctuates sharply. This raises a disadvantage in that if the power is supplied using a fuel cell to equipment subjected to large fluctuations in its load current, such fluctuations in the load current bring about changes in the output voltage so that the output voltage becomes unstable.

Therefore, a hybrid-type power supply apparatus is known which is formed by combining a power storage device responsive to a fluctuation in a load current, for example, a secondary battery, and a fuel cell (e.g., refer to Japanese Patent Laid-Open No. 2005-56764 specification). FIG. 8 is a block diagram, showing the configuration of such a hybrid-type power supply apparatus. A power supply apparatus 101 shown in FIG. 8 is configured by; a fuel cell 102; a DC-DC converter 103 which converts the electric power outputted from the fuel cell 102 into a power-supply voltage for operating a load apparatus 105 and outputs it; and a secondary battery 104 which is charged with the power-supply voltage outputted from the DC-DC converter 103.

The power supply apparatus 101 stores the power outputted from the fuel cell 102 temporarily in the secondary battery 104. Then, it supplied this power from the secondary battery 104 to the load apparatus 105. The secondary battery 104 responsive to fluctuations in the load current absorbs load-current changes, thereby helping stabilize the power supply apparatus 101's output voltage. Therefore, in the power supply apparatus 101, the fuel cell 102 is designed to supply the power continuously for a long time, and this fuel cell 102 charges the secondary battery 104. As a result, the power can be supplied for more hours, and at the same time, the output voltage becomes more stable.

Nevertheless, in the power supply apparatus 101 having the above described configuration, the secondary battery 104's output voltage as it is becomes an output voltage VL to the load apparatus 105. In terms of the secondary battery 104's output voltage, each kind of secondary battery has an intrinsic voltage. For example, in the case of a nickel-hydrogen secondary battery, it is approximately 1.2 volts per cell, while in the case of a lithium-ion secondary battery, it is approximately 4.2 volts per cell when it is fully charged by the fuel cell 102.

If the power-supply voltage necessary for the load apparatus 105 to operate is different from the intrinsic voltage of each such secondary battery 104, a plurality of such secondary batteries 104 need connecting in series so that the output voltage VL is set to a desirable voltage.

However, the output voltage per cell of a secondary battery is equivalent, as described above, to the intrinsic voltage of each kind of secondary battery. Hence, the output voltage VL can be set only to multiples of the output voltage intrinsic to a secondary battery. Therefore, if the operation power-supply voltage necessary for the load apparatus 105 is a voltage value different from the multiples of the output voltage intrinsic to a secondary battery, a disadvantage arises in that such a hybrid-type power supply apparatus as the power supply apparatus 101 cannot be used as a power source for the load apparatus 105.

SUMMARY OF THE INVENTION

It is an object of the present invention to provide a power supply apparatus which is capable of supplying electric power for a longer time as well as making its output voltage more stable, and simultaneously, setting this output voltage more freely.

A power supply apparatus according to an aspect of the present invention, comprising: a fuel cell; a power storage device which stores electric power; a connection terminal for connecting a load; a charge-used voltage converter which converts an output voltage of the fuel cell into a charging voltage used as a voltage for charging the power storage device and charges the power storage device; and an output-used voltage converter which converts an output voltage of the power storage device into a set output voltage determined in advance and outputs the set output voltage to the connection terminal.

In this power supply apparatus, using the charge-used voltage converter, the output voltage outputted from the fuel cell is converted into the charging voltage for charging the power storage device. Then, the power storage device is charged with this charging voltage, so that electric power is stored. Furthermore, using the output-used voltage converter, the output voltage of the power storage device is converted into the set output voltage determined in advance and is applied to the connection terminal. In this case, the power obtained by the fuel cell is supplied to a load, thus helping supply the power for more hours to the load. Moreover, the power obtained by the fuel cell is stored in the power storage device responsive to a fluctuation in a load current, and then, it is supplied from the power storage device to a load. Thereby, the output-voltage stability can be improved. In addition, the output voltage of the power storage device is converted into the set output voltage determined in advance by the output-used voltage converter. Then, it is applied to the connection terminal and is outputted to a load connected to the connection terminal. Therefore, the set output voltage can be set without any restrictions from the power storage device's output voltage. This makes it possible to enhance the degree of freedom to set the output voltage.

These and other objects, features and advantages of the present invention will become more apparent upon reading of the following detailed description along with the accompanied drawings.

DESCRIPTION OF THE PREFERRED EMBODIMENTS

Figure 1:
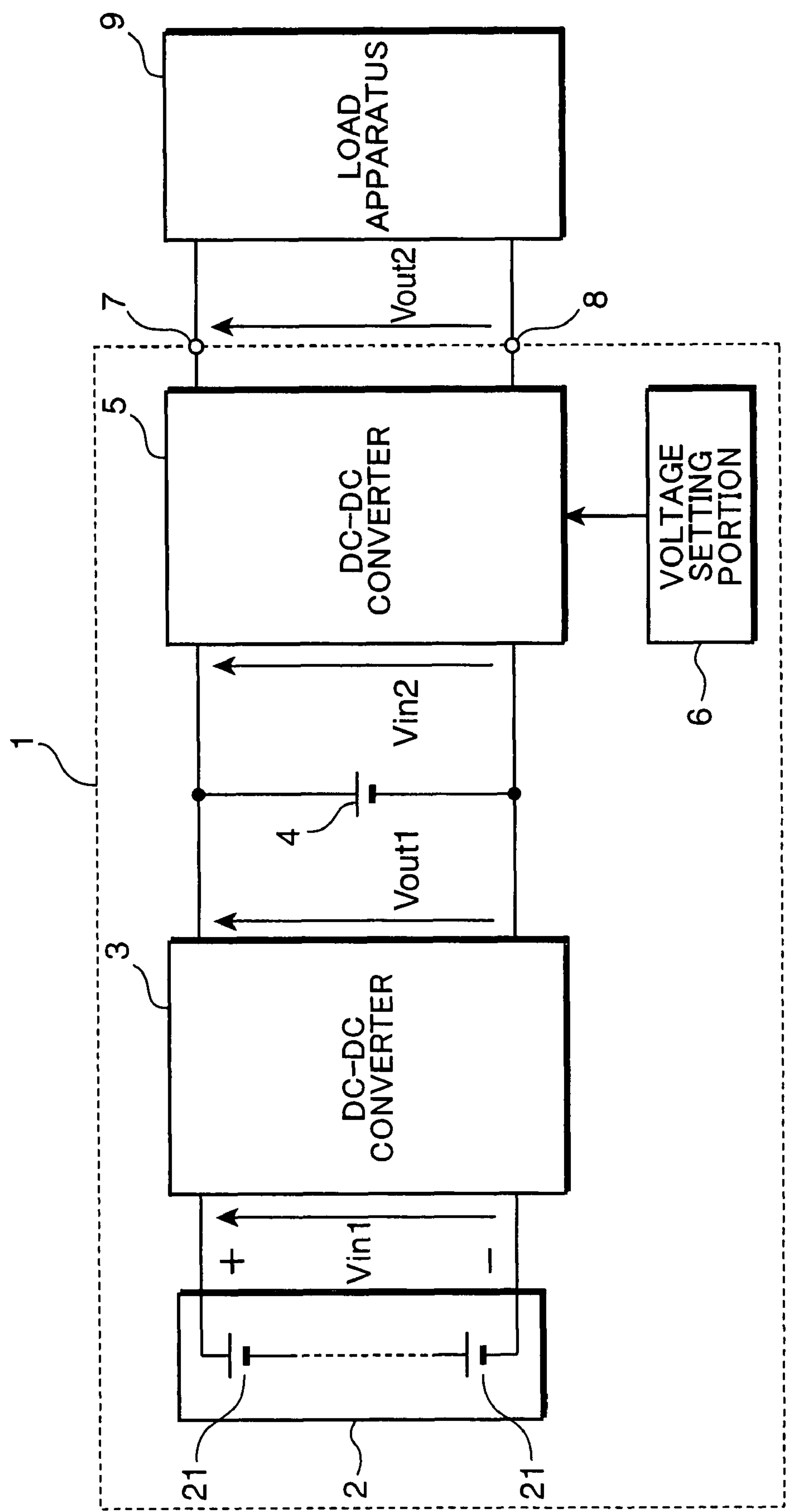
FIG. 1 is a block diagram, showing an example of the configuration of a power supply apparatus according to an embodiment of the present invention.

Hereinafter, a power supply apparatus according to each embodiment of the present invention will be described with reference to the attached drawings. In each figure, component elements are given the same reference characters and numerals, as long as they are identical to one another. Thus, their description is omitted. FIG. 1 is a block diagram, showing an example of the configuration of a power supply apparatus according to an embodiment of the present invention.

A power supply apparatus 1 shown in FIG. 1 is configured by; a fuel cell 2; a secondary battery 4 which stores electric power; connection terminals 7, 8 for connecting a load apparatus 9 on the outside of the power supply apparatus 1; a DC-DC converter 3 (i.e., the charge-used voltage converter) which converts a voltage Vin1 outputted from the fuel cell 2 into a voltage Vout1 (i.e., the charging voltage) for charging the secondary battery 4 and applies it to the secondary battery 4; and a DC-DC converter 5 (i.e., the output-used voltage converter) which converts a voltage Vin2 outputted from the secondary battery 4 into a set output voltage Vout2 which corresponds to the setting accepted by a voltage setting portion 6 and outputs it to the connection terminals 7, 8.

The load apparatus 9 is, for example, portable electronic equipment, such as a portable personal computer, a cell phone, a portable music reproducer and a portable game machine. The power supply apparatus 1 can be installed in a mobile body, such as a hybrid electric car, an electric car, an electric motorbike and an electrical-assist bicycle. Hence, it may also supply electric power to the load apparatus 9, such as a motive-power circuit and a control circuit of the mobile body like those. In addition, the power supply apparatus 1 may also be used as a stationary charging apparatus which charges a secondary battery used as the power source of such portable electronic equipment or a mobile body. Besides, it may also be used as an emergency power-supply apparatus or outdoor gear.

The connection terminals 7, 8 are a connection terminal for outputting the set output voltage Vout2 of the power supply apparatus 1 to the load apparatus 9. They are designed so as to connect with the power input terminals of the load apparatus 9. The connection terminals 7, 8 may also be, for example, a connector. For example, they may also be a land or a through hole provided in a wiring board which forms a part of the DC-DC converter 5.

The fuel cell 2 is formed, for example, by connecting a plurality of fuel cells 21 in series. As the fuel cells 21, for example, various fuel cells can be used, such as an active DMFC (or direct methanol fuel cell), a passive DMFC, a DDFC (or direct DME fuel cell) and an RMFC (or reformed methanol fuel cell). To each fuel cell 21, fuel, for example, methanol is supplied from a fuel tank (not shown), for example, at a supply speed which is preset according to the average power consumption of the load apparatus 9.

Incidentally, the fuel cell 2 is not limited to such a formation as given in this example where the plurality of fuel cells 21 are connected in series. For example, a plurality of fuel cells 21 may also be connected in parallel, or a single fuel cell 21 itself can also be used as the fuel cell 2.

As the secondary battery 4, for example, various secondary batteries can be used, such as a nickel-hydrogen secondary battery and a lithium-ion secondary battery. The secondary battery 4 may also be formed, for example, by connecting a plurality of secondary-battery cells in series or in parallel.

Figure 2:
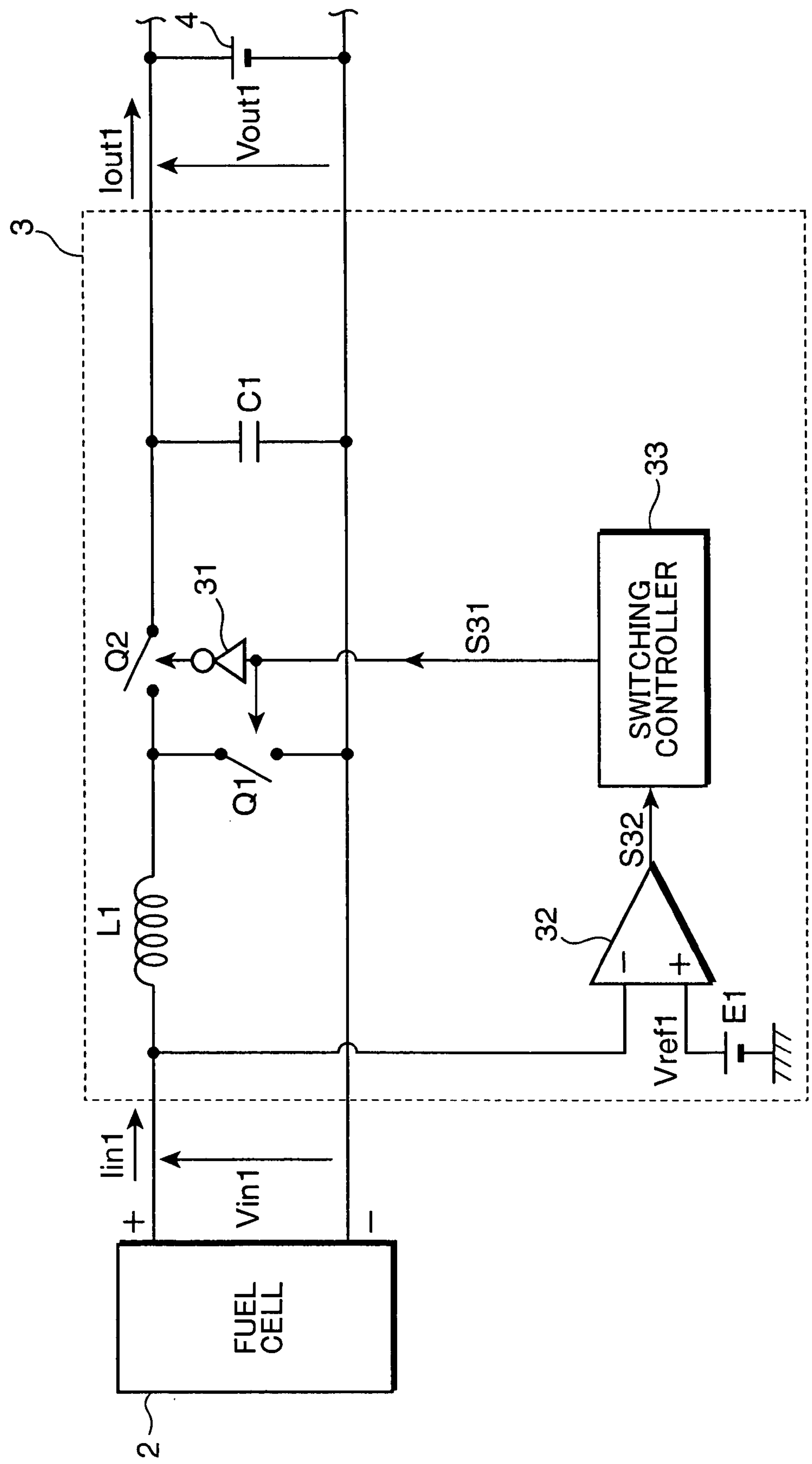
FIG. 2 is a circuit diagram, showing an example of the configuration of a DC-DC converter shown in FIG. 1.

FIG. 2 is a circuit diagram, showing an example of the configuration of the DC-DC converter 3. The DC-DC converter 3 shown in FIG. 2 is, for example, a step-up DC-DC converter. The DC-DC converter 3 is formed, for example, by a coil L1, switching elements Q1, Q2, a capacitor C1, an inverter 31, a differential amplifier 32, a switching controller 33 and a reference voltage source E1.

Then, the positive electrode of the fuel cell 2 is connected, via the, coil L1 and the switching element Q1, to the negative electrode of the fuel cell 2. In parallel with the switching element Q1, the series circuit of the switching element Q2 and the capacitor C1 is connected. Hence, the capacitor C1's voltage between both ends is applied as the voltage Vout1 to the secondary battery 4.

The switching elements Q1, Q2 are each formed, for example, by a transistor. The switching controller 33 is a control circuit which controls the on-and-off operation of the switching elements Q1, Q2, using the control of a PWM (or pulse width modulation). Thereby, it regulates an electric current Iin1 which flows from the fuel cell 2 into the DC-DC converter 3 and the output voltage Vout1 of the DC-DC converter 3. The switching controller 33 outputs, for example, a control signal S31 whose duty factor D is set through the PWM control, to the switching element Q1 and the inverter 31. The inverter 31 allows the control signal S31 to undergo a level inversion and outputs it to the switching element Q2.

The reference voltage source E1 is a constant-voltage circuit which outputs, to the differential amplifier 32, a reference voltage Vref1 set in advance as a target value for the voltage Vin1 corresponding to the output voltage of the fuel cell 2. The differential amplifier 32 outputs, to the switching controller 33, an difference voltage signal S32 which represents the difference between the voltage Vin1 as the output voltage of the fuel cell 2 and the reference voltage Vref1 outputted from the reference voltage source E1.

When the quantity of a fuel supplied to a fuel cell is fixed, the power to be generated is varied according to the output voltage of the fuel cell at the time of power generation. Hence the power-generation efficiency is varied according to the output voltage. Hence, it is desirable that the voltage Vin1 be a voltage at which the fuel cell 2 can generate electric power efficiently.

On the other hand, the output voltage Vin1 of the fuel cell 2 drops, as the output current of the fuel cell 2, in other words, the electric current Iin1 which flows from the fuel cell 2 into the DC-DC converter 3 increases. In contrast, it rises as the electric current Iin1 decreases. Therefore, the switching controller 33 sets the duty factor D of the control signal S31 suitably, and thus, it controls the electric current Iin1 which flows in from the fuel cell 2. Thereby, the voltage Vin1 can be obtained so that the fuel cell 2's power-generation efficiency becomes better.

Specifically, in the reference voltage source E1, an output voltage where the fuel cell 2's power-generation efficiency becomes better, for example, the output voltage where the power-generation efficiency comes to the maximum is set as the reference voltage Vref1. Then, if the difference voltage signal S32 indicates a negative value and the voltage Vin1 is beyond the reference voltage Vref1, the switching controller 33 raises the duty factor D of the control signal S31 and increases the current Iin1. Thereby, the voltage Vin1 equivalent to the fuel cell 2's output voltage is reduced so as to approximate the reference voltage Vref1. On the other hand, if the difference voltage signal S32 indicates a positive value and the voltage Vin1 is below the reference voltage Vref1, the switching controller 33 lowers the duty factor D of the control signal S31 and decreases the current Iin1. Thereby, the voltage Vin1 equivalent to the fuel cell 2's output voltage is raised so as to approximate the reference voltage Vref1. As a result, the voltage Vin1 equivalent to the fuel cell 2's output voltage is adjusted so as to be equal with the reference voltage Vref1. This helps determine the operating point of the fuel cell 2.

In this case, the differential amplifier 32 corresponds to an example of the voltage detection portion, and the differential amplifier 32 and the switching controller 33 function as the control portion.

Figure 3:
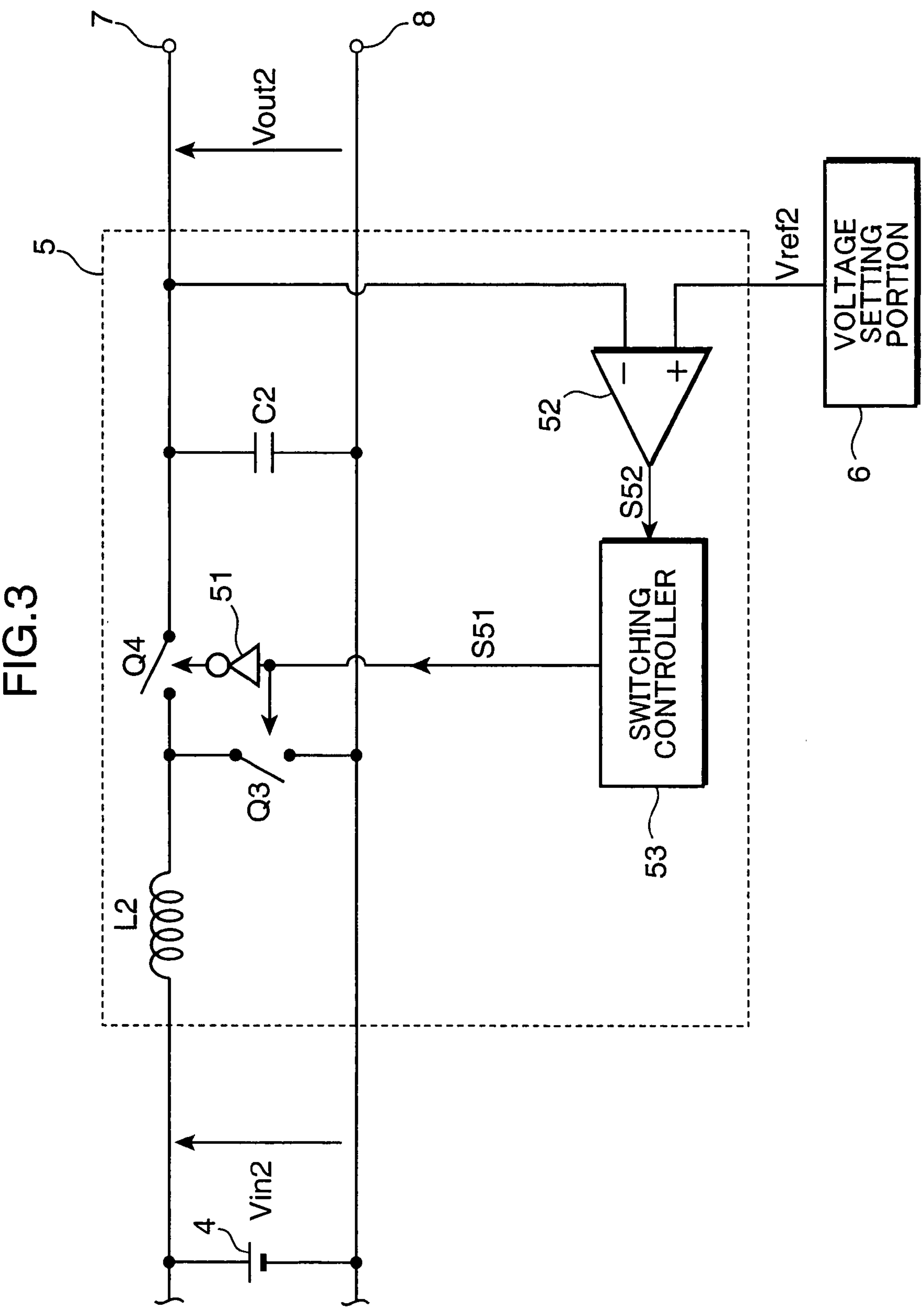
FIG. 3 is a circuit diagram, showing an example of the configuration of the DC-DC converter shown in FIG. 1.

FIG. 3 is a circuit diagram, showing an example of the configuration of the DC-DC converter 5. The voltage setting portion 6 is a setting portion which accepts the setting of the set output voltage Vout2 and outputs this set voltage as a set voltage Vref2 to a differential amplifier 52. The voltage setting portion 6 is formed, for example, by: a variable resistor called a volume switch whose resistance value can be set by an operator's operation; and a constant-voltage circuit which outputs the voltage corresponding to the volume switch's resistance value as the set voltage Vref2. Incidentally, as the voltage setting portion 6, another kind may also be used, as long as it outputs the voltage in accordance with the setting of an operator as the set voltage Vref2. For example, the one can be adopted which accepts the setting of the set output voltage Vout2 by a dipswitch or a rotary switch and outputs this set voltage as the set voltage Vref2 to the differential amplifier 52.

The DC-DC converter 5 shown in FIG. 3 is, for example, a step-up DC-DC converter. The DC-DC converter 5 is formed, for example, by a coil L2, switching elements Q3, Q4, a capacitor C2, an inverter 51, a differential amplifier 52, and a switching controller 53.

Then, the positive electrode of the secondary battery 4 is connected, via the coil L2 and the switching element Q3, to the negative electrode of the secondary battery 4. In parallel with the switching element Q3, the series circuit of the switching element Q4 and the capacitor C2 is connected. Hence, the capacitor C2's voltage between both ends is applied as the set voltage Vref2 to the connection terminals 7, 8.

The switching elements Q3, Q4 are each formed, for example, by a transistor. The switching controller 53 is a control circuit which controls the on-and-off operation of the switching elements Q3, Q4 through the PWM control so that the set output voltage Vout2 of the DC-DC converter 5 can be regulated. The switching controller 53 outputs, for example, a control signal S51 whose duty factor D is set through the PWM control, to the switching element Q3 and the inverter 51. The inverter 51 allows the control signal S51 to undergo a level inversion and outputs it to the switching element Q4.

The differential amplifier 52 outputs, to the switching controller 53, an difference voltage signal S52 which represents the difference between: the voltage at the connection point of the switching element Q4 to the capacitor C2, in other words, the set output voltage Vout2; and the set voltage Vref2 outputted from the voltage setting portion 6.

Then, if the difference voltage signal S52 indicates a negative value and the set output voltage Vout2 is beyond the set voltage Vref2, the switching controller 53 lowers the duty factor D of the control signal S51 and drops the set output voltage Vout2, so that it approximates the set voltage Vref2. On the other hand, if the difference voltage signal S52 indicates a positive value and the set output voltage Vout2 is below the set voltage Vref2, the switching controller 53 raises the duty factor D of the control signal S51 and heightens the set output voltage Vout2, so that it approximates the set voltage Vref2. Thereby, the set output voltage Vout2 is designed to be equal with the set voltage Vref2 which the operator has set using the voltage setting portion 6.

Incidentally, the DC-DC converter 5 is described as an example of the output-used voltage converter. However, for example, in the case where the load apparatus 9 is driven using an AC power-supply voltage, as the output-used voltage converter, a DC-AC converter may also be used which converts the secondary battery 4's DC output voltage into an AC voltage and outputs it as the set output voltage Vout2.

Next, an operation will be described of the power supply apparatus 1 having the above described configuration. First, for example, in the case where the power supply apparatus 1 is used as the power source of the load apparatus 9, an operator sets a power-supply voltage for operating the load apparatus 9, using the voltage setting portion 6. Then, from the voltage setting portion 6, the power-supply voltage for operating the load apparatus 9 is outputted as the set voltage Vref2 to the differential amplifier 52.

Sequentially, the differential amplifier 32 outputs, to the switching controller 33, the difference voltage signal S32 between the voltage Vin1 outputted from the fuel cell 2 and the reference voltage Vref1 outputted from the reference voltage source E1. Then, if the difference voltage signal S32 indicates a negative value and the voltage Vin1 is beyond the reference voltage Vref1, the switching controller 33 raises the duty factor D of the control signal S31 and increases the electric current Iin1. Thereby, the voltage Vin1 which is the fuel cell 2's output voltage is reduced so as to approximate the reference voltage Vref1. On the other hand, if the difference voltage signal S32 indicates a positive value and the voltage Vin1 is below the reference voltage Vref1, the switching controller 33 lowers the duty factor D of the control signal S31 and decreases the current Iin1. Thereby, the voltage Vin1 which is the fuel cell 2's output voltage is raised so as to approximate the reference voltage Vref1. As a result, the voltage Vin1 which is the fuel cell 2's output voltage is adjusted so as to be equal with the reference voltage Vref1. This helps determine the operating point of the fuel cell 2.

Consequently, the fuel cell 2 can output, to the DC-DC converter 3, such a voltage Vin1 as enhancing its power-generation efficiency. This makes it possible for the fuel cell 2 to generate electric power more efficiently.

Figure 4:
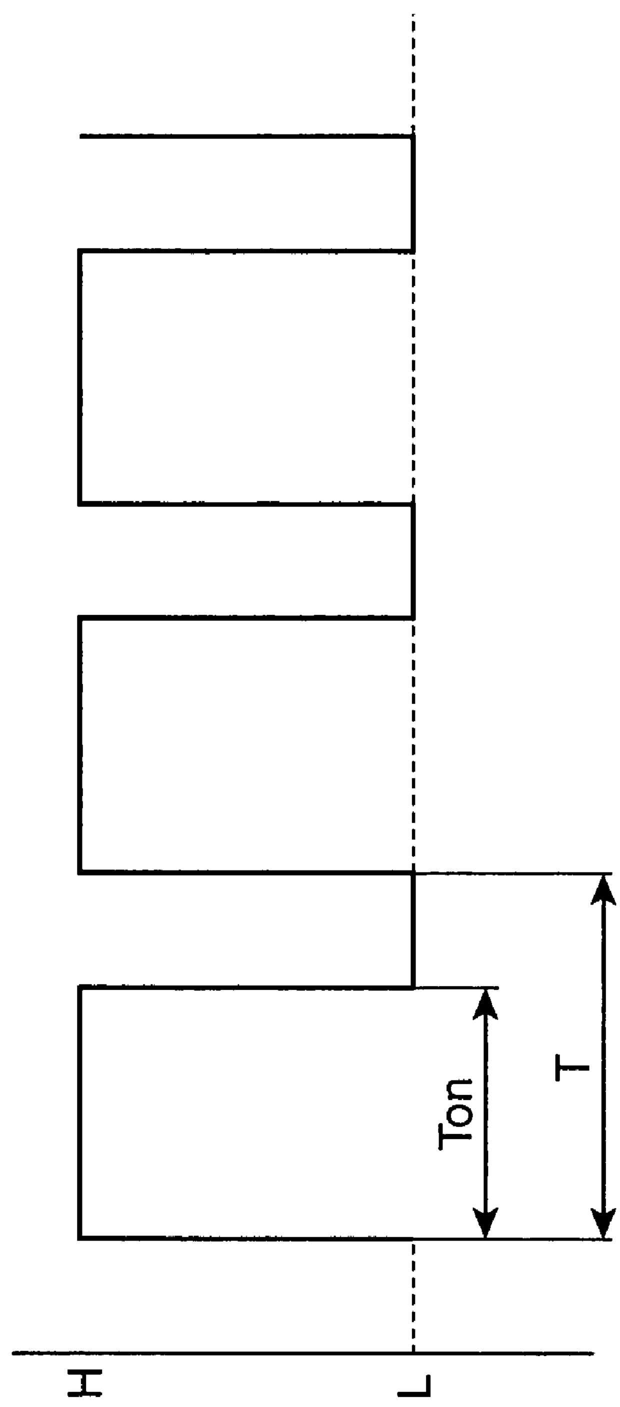
FIG. 4 is a waveform chart, showing the duty factor of a control signal in the DC-DC converter shown in FIG. 1.

FIG. 4 is a waveform chart, showing the duty factor D of the control signal S31 in the DC-DC converter 3 and the duty factor D of the control signal S51 in the DC-DC converter 5. In the signal waveform chart shown in FIG. 4, the cycle of the control signals S31, S51 is T, and during the cycle T, the period when the control signals S31, S51 stay at a high level H is Ton. In this case, the duty factor D becomes Ton/T.

Then, in the DC-DC converter 3 shown in FIG. 2, if the control signal S31 rises to the high level H, the switching element Q1 is switched on and the switching element Q2 is switched off. On the other hand, if the control signal S31 comes to a low level L, the switching element Q1 is switched off and the switching element Q2 is switched on. Herein, if the duty factor of the control signal S31 set by the switching controller 33 is D1, in terms of the DC-DC converter 3, the relation of the following formula (1) is satisfied.

$$Vout1/Vin1=1/(1-D_1) \quad (1)$$

Specifically, the voltage Vout1 is determined in principle by the residual capacity in the secondary battery 4. Hence, the voltage Vin1 serves as the output voltage from the fuel cell 2 according to the formula (1).

Incidentally, the DC-DC converter 3 is not necessarily limited to the example in which the control of a PWM is executed so that the voltage Vin1 which is the fuel cell 2's output voltage becomes constant using the reference voltage Vref1. Hence, the PWM control may also be executed so that the output current of the fuel cell 2 becomes a desirable current value.

In addition, an output current Iout1 of the DC-DC converter 3 is determined by an output voltage Vb of the secondary battery 4. If the electric power generated by the fuel cell 2 is P and the conversion efficiency of the DC-DC converter 3 is α, then the output current Iout1 is given in the following formula (2).

$$Iout1=P\times\alpha/Vb \quad (2)$$

Herein, if the load current of the load apparatus 9 decreases so that the electric current which flows into the DC-DC converter 5 becomes less than the output current Iout1 outputted from the DC-DC converter 3, this surplus electric current is supplied to the secondary battery 4 so that the secondary battery 4 is charged. On the other hand, if the load current of the load apparatus 9 increases so that the electric current which flows into the DC-DC converter 5 becomes more than the output current Iout1 outputted from the DC-DC converter 3, this short electric current is supplied from the secondary battery 4 to the DC-DC converter 5.

Therefore, when the load apparatus 9's load current fluctuates, if the output current Iout1 of the DC-DC converter 3 becomes excessive, the secondary battery 4 is charged. On the other hand, if the output current Iout1 becomes short, this short electric current is supplied from the secondary battery 4. As a result, such a fluctuation in the load current can be absorbed, thus continuing the supply of electric power stably even if the load current fluctuates.

Next, in the DC-DC converter 5 shown in FIG. 3, the control signal S51 is outputted by the switching controller 53. Then, the on-and-off operation of the switching elements Q3, Q4 is executed, and the voltage Vin2 is converted into the set output voltage Vout2 and is outputted to the connection terminals 7, 8. Thereby, the differential amplifier 52 outputs, to the switching controller 53, the difference voltage signal S52 between the set output voltage Vout2 and the set voltage Vref2 outputted from the voltage setting portion 6.

Then, if the difference voltage signal S52 indicates a negative value, in other words, if the set output voltage Vout2 is beyond the set voltage Vref2, the switching controller 53 lowers the duty factor D of the control signal S51 and drops the set output voltage Vout2, so that it approximates the set voltage Vref2. On the other hand, if the difference voltage signal S52 indicates a positive value, in other words, if the set output voltage Vout2 is below the set voltage Vref2, the switching controller 53 raises the duty factor D of the control signal S51 and heightens the set output voltage Vout2, so that it approximates the set voltage Vref2. Thereby, the set output voltage Vout2 which is the output voltage of the power supply apparatus 1 is adjusted so as to be equal with the set voltage Vref2 which is the power-supply voltage for operating the load apparatus 9.

The operation for setting the duty factor D of the control signal S51 using the switching controller 53 will be described in further detail. In the signal waveform chart shown in FIG. 4, the cycle of the control signal S51 is T, and during the cycle T, the period when the control signal S51 is at the high level H is Ton. In this case, the duty factor D becomes Ton/T.

Then, in the DC-DC converter 5 shown in FIG. 3, if the control signal S51 rises to the high level H, the switching element Q3 is switched on and the switching element Q4 is switched off. On the other hand, if the control signal S51 comes to the low level L, the switching element Q3 is switched off and the switching element Q4 is switched on. Herein, if the duty factor of the control signal S51 is $D_2$, in terms of the DC-DC converter 5, the relation expressed in the following formula (3) is satisfied.

$$Vout2/Vin2=1/(1-D_2) \quad (3)$$

In the formula (3), the set output voltage Vout2 is equal to the set voltage Vref2 which is the power-supply voltage for operating the load apparatus 9. Thereby, the duty factor $D_2$ satisfies Vref2/Vin2=1/(1−$D_2$), so that the set output voltage Vout2 which is the output voltage of the power supply apparatus 1 is adjusted so as to be equal with the set voltage Vref2 which is the power-supply voltage for operating the load apparatus 9. In this case, independent of the voltage intrinsic to the secondary battery 4, the set output voltage Vout2 is equivalent to the set voltage Vref2 which an operator sets using the voltage setting portion 6. This helps enhance the degree of freedom to set the set output voltage Vout2. Besides, using the voltage setting portion 6, the operator sets the set voltage Vref2 to the power-supply voltage for operating the load apparatus 9. Hence, a desirable power-supply voltage can be outputted from the power supply apparatus 1. This makes it possible for the power supply apparatus 1 to supply electric power to each kind of such load apparatus 9 which operates at a different power-supply voltage.

Incidentally, the DC-DC converters 3, 5 are illustrated as a step-up type, but they are not limited to such a step-up DC-DC converter. In accordance with the effective output voltage obtained by the fuel cell 2's power-generation operation and the voltage value required by the load apparatus 9, each DC-DC converter can also be a step-down type, a step-up/down type, an inverting type, or the like.

Figure 5:
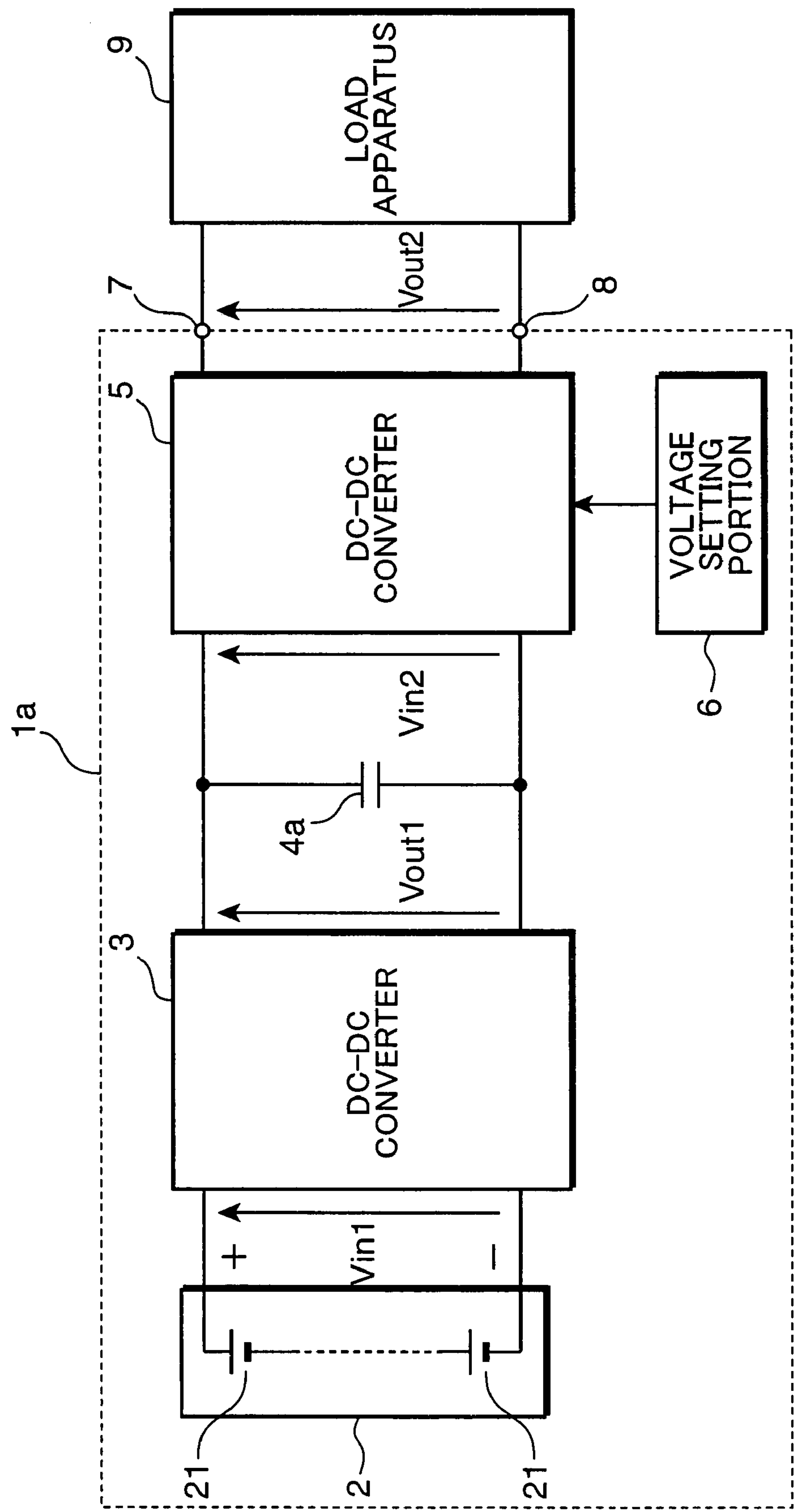
FIG. 5 is a block diagram, showing a variation of the power supply apparatus shown in FIG. 1.

In addition, as can be seen from a power supply apparatus 1*a* shown in FIG. 5, instead of the secondary battery 4, a capacitor 4*a* may also be used as the power storage device. The capacitor 4*a* has no such cycle life span as the secondary battery 4, and its price is lower than that of the secondary battery 4. Hence, as the power storage device, if the secondary battery 4 is replaced with the capacitor 4*a*, the power supply apparatus 1's lifetime can be easily lengthened. At the same time, its costs can also be cut down with ease.

Herein, when the capacitor 4*a* is used as the power storage device, the capacitor 4*a*'s voltage between both ends, in other words, the voltage Vin2, is given in the following formula (4).

$$Vin2=Q/C \quad (4)$$

Herein,

Q: the capacitor 4*a*'s stored-electricity quantity (coulomb)

C: the capacitor 4*a*'s capacitance (F).

In accordance with the formula (4), the capacitor 4*a*'s both-end voltage or the voltage Vin2 changes in proportion to the quantity of electricity stored in the capacitor 4*a*. Hence, compared with the case where the secondary battery 4 is used as the power storage device, the voltage Vin2 is subjected to a larger change. As the voltage Vin2 changes, in accordance with the above described formula (3), the set output voltage Vout2 of the DC-DC converter 5 undergoes a change. This change in the set output voltage Vout2 is fed back to the duty factor $D_2$ of the control signal S51 by the differential amplifier 52 and the switching controller 53. As a result, the set output voltage Vout2 remains as the set voltage Vref2. However, a delay time is produced from the change in the set output voltage Vout2 until this change is fed back to the duty factor $D_2$ of the control signal S51 by the differential amplifier 52 and the switching controller 53. Thereby, the change in the voltage Vin2 appears as the change in the set output voltage Vout2, though it is temporary.

Therefore, in order to stabilize the set output voltage Vout2, desirably, the change in the voltage Vin2 should be reduced. In the case where the capacitor 4*a* is used as the power storage device, as can be seen from the formula (4), if the capacitor 4*a*'s capacitance C is increased, a reduction can be realized in the quantity of a change in the voltage Vin2 which is caused by a change per unit electric charge in the quantity of stored electricity.

Figure 6:
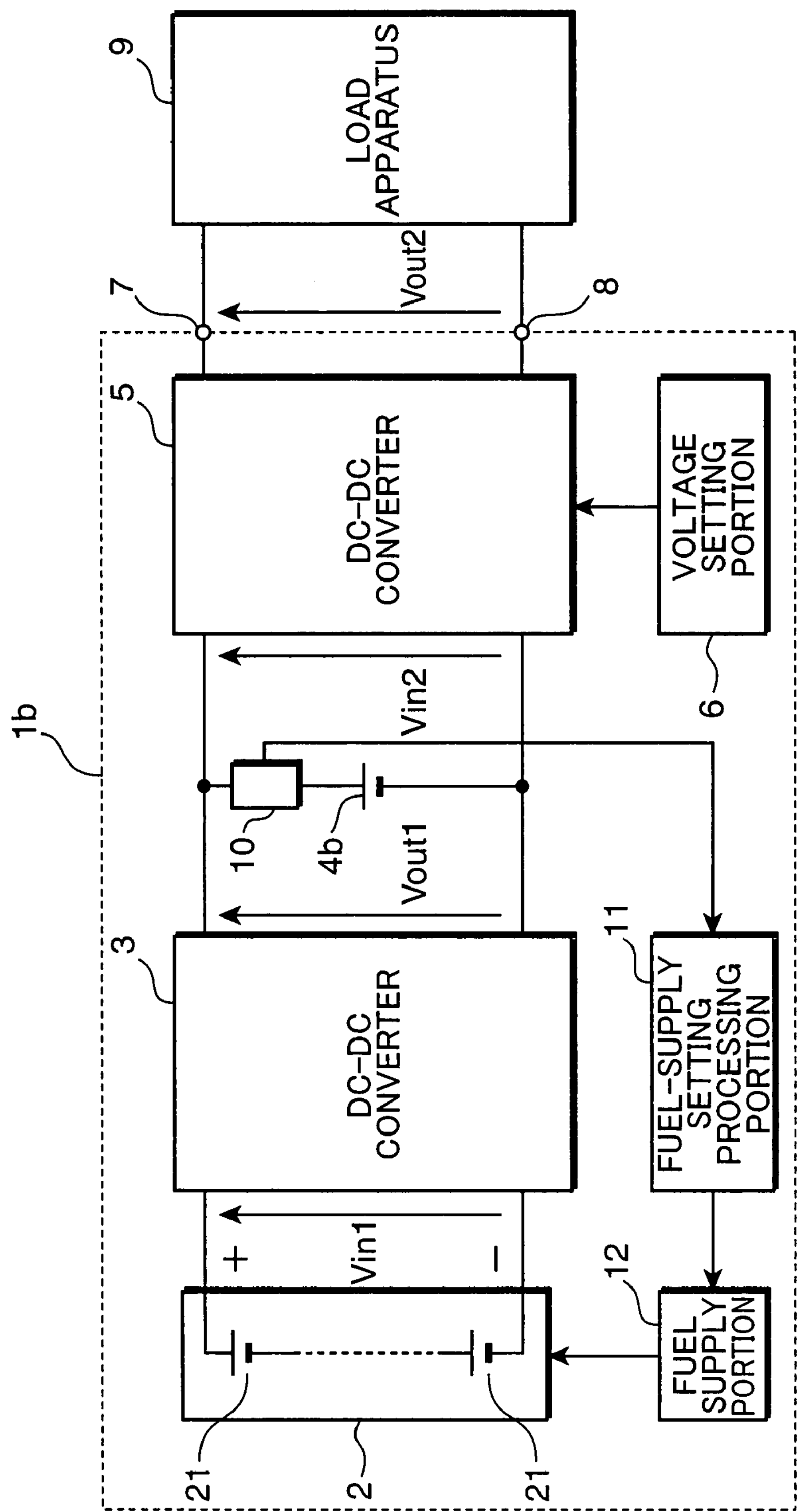
FIG. 6 is a block diagram, showing a variation of the power supply apparatus shown in FIG. 1.

In addition, for example, as shown in FIG. 6, an electric-current detection portion 10, a fuel-supply setting processing portion 11 and a fuel supply portion 12 may also be further provided. The electric-current detection portion 10 is, for example, an electric-current detection circuit which outputs, to the fuel-supply setting processing portion 11, a signal which represents a charging-and-discharging current of a power storage device 4*b* formed by a secondary battery, a capacitor or the like. In this case, the electric-current detection portion 10 may also be configured, for example, so as to detect, as the power storage device 4*b*'s charging-and-discharging current, the average value, cumulative value or the like of a charging current to the power storage device 4*b* and a discharging current from the power storage device 4*b* within a predetermined period of time.

The fuel supply portion 12 is, for example, formed by a fuel tank which stores a fuel, and a pump which supplies the fuel stored in the fuel tank to the fuel cell 2. By the way, the power storage device 4's capacity is determined in view of the width of fluctuations in the electric power of a load and the control responsiveness of electric power generated by the fuel cell 2.

The fuel-supply setting processing portion 11 is, for example, formed by a microcomputer. On the basis of the charging-and-discharging current detected by the electric-current detection portion 10, it regulates the fuel supply to the fuel cell 2 by the fuel supply portion 12 so that the power storage device 4*b*'s charging-and-discharging current is reduced so as to approach zero. Thereby, the amount of electric power generated by the fuel cell 2 can be set. As the technique of regulating the fuel cell 2's generated-power amount so that the power storage device 4*b*'s charging-and-discharging current approaches zero, the art described in Patent Document(e.g., refer to Japanese Patent Laid-Open No. 2005-56764 specification) can be used. Hereinafter, to reduce the charging-and-discharging current means to bring its absolute value toward the direction of zero.

Herein, there is a case where the load apparatus 9's power consumption increases so that the sum of a power consumption of the load apparatus 9 and a power loss of such a power supply apparatus 1*b* becomes greater than the electric power generated by the fuel cell 2. In that case, from the power storage device 4*b* as well as the fuel cell 2, electric power is supplied through the DC-DC converter 5 to the load apparatus 9. In short, a discharging current flows from the power storage device 4*b*. On the other hand, if the load apparatus 9's power consumption decreases so that the sum of a power consumption of the load apparatus 9 and a power loss of the power supply apparatus 1*b* is less than the electric power generated by the fuel cell 2, then a charge of the surplus of the power generated by the fuel cell 2 is given to the power storage device 4*b*. In short, a charging current flows to the power storage device 4*b*.

Therefore, the greater the difference between the power left when the power loss of the power supply apparatus 1*b* is subtracted from the power generated by the fuel cell 2 and the power consumed by the load apparatus 9 becomes, the larger the charging-and-discharging current of the power storage device 4*b* becomes. Herein, in the power supply apparatus 1*b*, the power generated by the fuel cell 2 is controlled so that the power storage device 4*b*'s charging-and-discharging current comes close to zero. This makes it possible to narrow the width of fluctuations in the charging-and-discharging of the power storage device 4*b*. As a result, the capacity of the power storage device 4*b* can be reduced, thus making the power storage device 4*b* smaller.

By the way, the control of a fuel supply is effective in controlling generated power for many hours. However, in order to change the power generated by the fuel cell 2 within a short period of time, the control of the fuel cell 2's output voltage is suitable.

Figure 7:
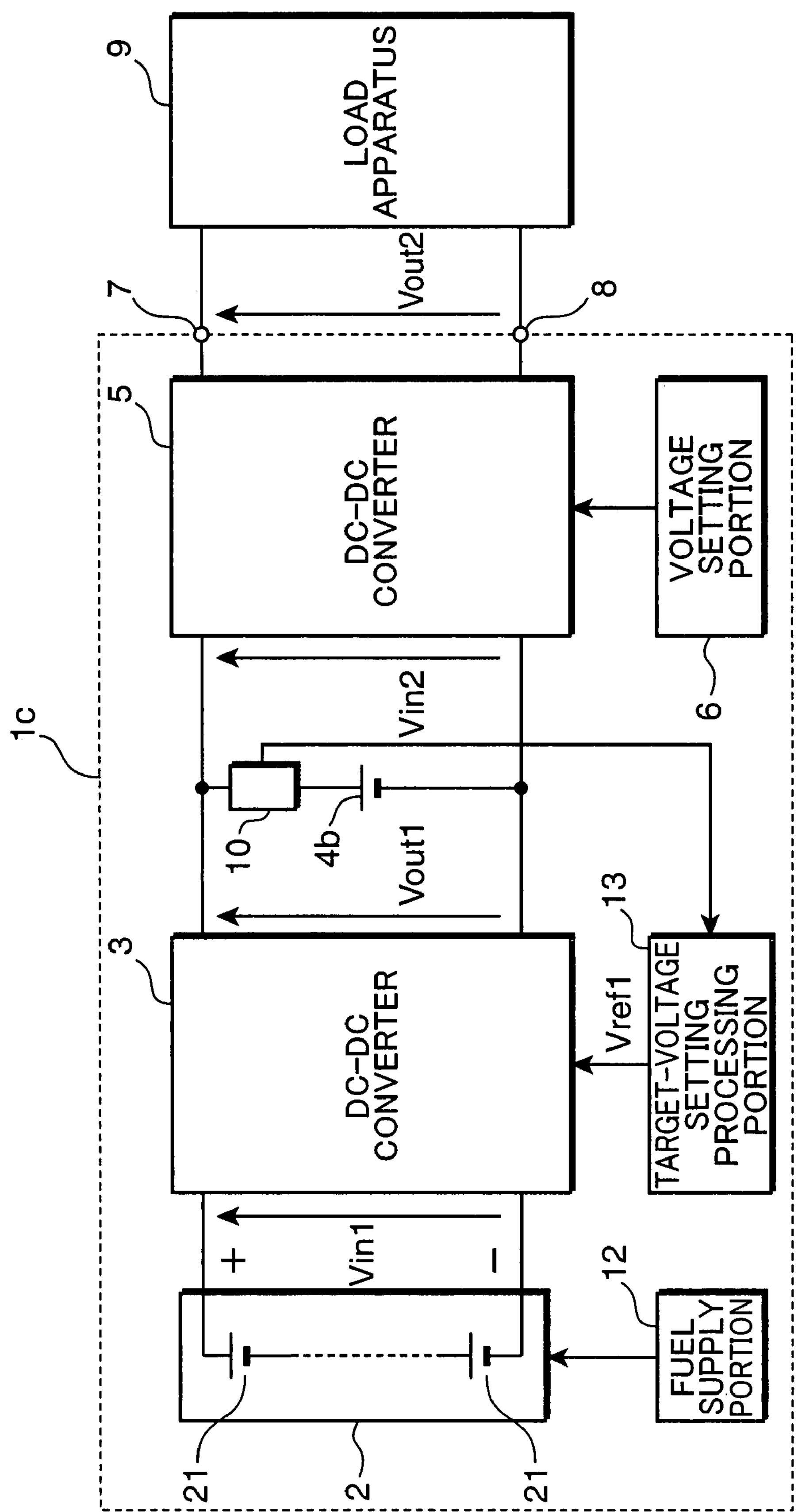
FIG. 7 is a block diagram, showing a variation of the power supply apparatus shown in FIG. 1.
Figure 8:
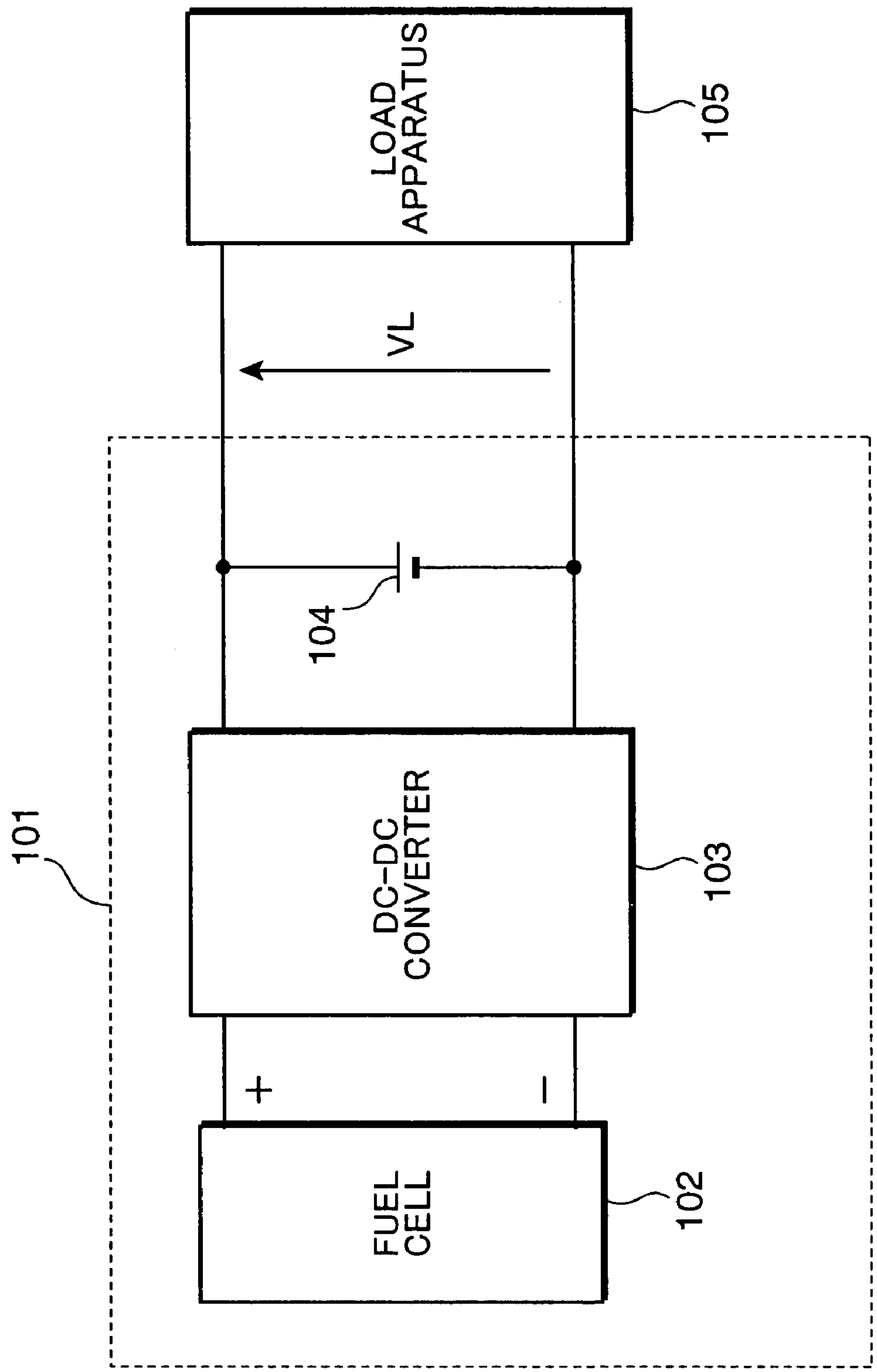
FIG. 8 is a block diagram, showing the configuration of a power supply apparatus according to a background art.

Accordingly, as can be seen from a power supply apparatus 1*c* shown in FIG. 7, instead of the fuel-supply setting processing portion 11, a target-voltage setting processing portion 13 may also be provided. The target-voltage setting processing portion 13 is, for example, formed by a microcomputer. On the basis of the charging-and-discharging current detected by the electric-current detection portion 10, it sets the reference voltage Vref1 and outputs it to the differential amplifier 32 so that the power storage device 4*b*'s charging-and-discharging current is reduced so as to approach zero. Specifically, the target-voltage setting processing portion 13 raises the reference voltage Vref1, if the direction in which the charging-and-discharging current detected by the electric-current detection portion 10 flows is identical with the direction in which the power storage device 4*b* is charged, in other words, if the electric power charged from the DC-DC converter 3 to the power storage device 4*b* is greater than the electric power discharged from the power storage device 4*b* to the DC-DC converter 5. Thereby, the differential amplifier 32 and the switching controller 33 lower the duty factor D of the control signal S31 and decreases the current Iin1 so that the difference between the voltage Vin1 and the reference voltage Vref1 can be narrowed. As a result, the electric power supplied from the DC-DC converter 3 to the power storage device 4*b* decreases, so that the power storage device 4*b*'s charging-and-discharging current can be reduced.

In contrast, the target-voltage setting processing portion 13 lowers the reference voltage Vref1, if the direction in which the charging-and-discharging current detected by the electric-current detection portion 10 flows is identical with the direction in which electricity is discharged from the power storage device 4*b*, in other words, if the electric power charged from the DC-DC converter 3 to the power storage device 4*b* is less than the electric power discharged from the power storage device 4*b* to the DC-DC converter 5. Thereby, the differential amplifier 32 and the switching controller 33 raises the duty factor D of the control signal S31 and increases the current Iin1 so that the difference between the voltage Vin1 and the reference voltage Vref1 can be narrowed. As a result, the electric power supplied from the DC-DC converter 3 to the power storage device 4*b* increases, so that the power storage device 4*b*'s charging-and-discharging current can be reduced.

In this way, in the power supply apparatus 1*c*, the output voltage of the fuel cell 2 is set and the power generated by the fuel cell 2 is controlled so that the power storage device 4*b*'s charging-and-discharging current comes close to zero. This makes it possible to narrow the width of fluctuations in the charging-and-discharging of the power storage device 4*b*. As a result, the capacity of the power storage device 4*b* can be reduced, thus making the power storage device 4*b* smaller.

Incidentally, both the fuel-supply setting processing portion 11 and the target-voltage setting processing portion 13 may also be provided. According to that configuration, when the load apparatus 9's power consumption fluctuates over a long period of time, the electric power generated by the fuel cell 2 can be controlled by regulating the fuel supply. On the other hand, when the load apparatus 9's power consumption fluctuates momentarily, the electric power generated by the fuel cell 2 can be controlled by controlling the fuel cell 2's output voltage.

The power supply apparatus according to an aspect of the present invention can be used for portable electronic equipment, but its use is not limited to such equipment. It may also be installed in a mobile body, such as a hybrid electric car, an electric car, an electric motorbike and an electrical-assist bicycle. Furthermore, it can also be used in a stationary charging apparatus for such equipment. Moreover, it may also be used as an emergency power source, outdoor gear, and the like.

Then, the power supply apparatus according to an aspect of the present invention, comprising: a fuel cell; a power storage device which stores electric power; a connection terminal for connecting a load; a charge-used voltage converter which converts an output voltage of the fuel cell into a charging voltage used as a voltage for charging the power storage device and charges the power storage device; and an output-used voltage converter which converts an output voltage of the power storage device into a set output voltage determined in advance and outputs the set output voltage to the connection terminal.

According to this configuration, using the charge-used voltage converter, the output voltage outputted from the fuel cell is converted into the charging voltage for charging the power storage device. Then, the power storage device is charged with this charging voltage, so that electric power is stored. Furthermore, using the output-used voltage converter, the output voltage of the power storage device is converted into the set output voltage determined in advance and is applied to the connection terminal. In this case, the power obtained by the fuel cell is supplied to a load, thus helping supply the power for more hours to the load. Moreover, the power obtained by the fuel cell is stored in the power storage device responsive to a fluctuation in a load current, and then, it is supplied from the power storage device to a load. Thereby, the output-voltage stability can be improved. In addition, the output voltage of the power storage device is converted into the set output voltage determined in advance by the output-used voltage converter. Then, it is applied to the connection terminal and is outputted to a load connected to the connection terminal. Therefore, the set output voltage can be set without any restrictions from the power storage device's output voltage. This makes it possible to enhance the degree of freedom to set the output voltage.

Furthermore, it is preferable that the charge-used voltage converter include: a voltage detection portion which detects an output voltage of the fuel cell; and a control portion which regulates an electric current sent from the fuel cell to the charge-used voltage converter so that the difference narrows between an output voltage of the fuel cell detected by the voltage detection portion and a reference voltage set in advance as a target value for an output voltage of the fuel cell.

According to this configuration, an output voltage of the fuel cell is detected. Then, the control portion regulates the electric current which flows from the fuel cell into the charge-used voltage converter so that the difference narrows between the output voltage of the fuel cell detected by the voltage detection portion and a reference voltage set in advance as a target value for the output voltage of the fuel cell. Thereby, the fuel cell's output voltage is set to the target value. This makes it possible to operate the fuel cell using a predetermined targeted output voltage.

Moreover, preferably, the control portion should: increase an electric current sent from the fuel cell to the charge-used voltage converter when an output voltage of the fuel cell detected by the voltage detection portion exceeds the reference voltage; and decrease an electric current sent from the fuel cell to the charge-used voltage converter when an output voltage of the fuel cell detected by the voltage detection portion does not reach the reference voltage.

According to this configuration, the electric current which flows from the fuel cell into the charge-used voltage converter increases when the fuel cell's output voltage exceeds the reference voltage. As a result, the fuel cell's output voltage drops, so that the difference between the fuel cell's output voltage and the reference voltage can be narrowed. On the other hand, the electric current which flows from the fuel cell into the charge-used voltage converter decreases when the fuel cell's output voltage does not reach the reference voltage. As a result, the fuel cell's output voltage steps up, so that the difference between the fuel cell's output voltage and the reference voltage can be narrowed.

In addition, it is preferable that the reference voltage be set to a voltage at which the fuel cell has the maximum power-generation efficiency. According to this configuration, the fuel cell's output voltage is regulated so that the fuel cell has the maximum power-generation efficiency. This helps improve the fuel cell's power-generation efficiency.

Furthermore, preferably, the power supply apparatus should further comprise: an electric-current detection portion which detects a charging-and-discharging current of the power storage device; and a target-voltage setting processing portion which sets the reference voltage based on a charging-and-discharging current detected by the electric-current detection portion, so that this charging-and-discharging current decreases.

According to this configuration, using the target-voltage setting processing portion, the reference voltage is set so that the power storage device's charging-and-discharging current is reduced. Then, using the control portion, the electric current which flows from the fuel cell into the charge-used voltage converter is regulated and the fuel cell's output voltage is set so that the difference between the fuel cell's output voltage and the reference voltage is narrowed. This makes it possible to narrow the width of fluctuations in the charging-and-discharging power of the power storage device. As a result, the power storage device's capacity becomes smaller, thus making the size of the power storage device smaller.

Moreover, it is preferable that the target-voltage setting processing portion: heighten the reference voltage if a charging-and-discharging current detected by the electric-current detection portion flows in the direction where the power storage device is charged; and lower the reference voltage if a charging-and-discharging current detected by the electric-current detection portion flows in the direction where the power storage device is discharged.

According to this configuration, the target-voltage setting processing portion raises the reference voltage, if the direction in which the charging-and-discharging current detected by the electric-current detection portion flows is identical with the direction in which the power storage device is charged, in other words, if the electric power charged from the charge-used voltage converter to the power storage device is greater than the electric power discharged from the power storage device to the output-used voltage converter. Thereby, the control portion reduces the electric current which flows from the fuel cell into the charge-used voltage converter so that the difference between the fuel cell's output voltage and the reference voltage can be narrowed. As a result, the electric power which the charge-used voltage converter can supply to the power storage device decreases, so that the power storage device's charging-and-discharging current can be reduced. In contrast, the target-voltage setting processing portion lowers the reference voltage, if the direction in which the charging-and-discharging current detected by the electric-current detection portion flows is identical with the direction in which electricity is discharged from the power storage device, in other words, if the electric power charged from the charge-used voltage converter to the power storage device is less than the electric power discharged from the power storage device to the output-used voltage converter. Thereby, the control portion increases the electric current which flows from the fuel cell into the charge-used voltage converter so that the difference between the fuel cell's output voltage and the reference voltage can be narrowed. As a result, the electric power which the charge-used voltage converter can supply to the power storage device increases, so that the power storage device's charging-and-discharging current can be reduced.

In addition, preferably, the power supply apparatus should further comprise: an electric-current detection portion which detects a charging-and-discharging current of the power storage device; a target-voltage setting processing portion which sets the reference voltage based on a charging-and-discharging current detected by the electric-current detection portion, so that this charging-and-discharging current decreases; a fuel supply portion which supplies a fuel to the fuel cell; and a fuel-supply setting processing portion which sets the quantity of a fuel supplied to the fuel cell by the fuel supply portion, based on a charging-and-discharging current detected by the electric-current detection portion, so that this charging-and-discharging current decreases.

According to this configuration, using the target-voltage setting processing portion, the reference voltage is set so that the power storage device's charging-and-discharging current is reduced. Then, in order to narrow the difference between the reference voltage set by this target-voltage setting processing portion and the output voltage of the fuel cell, the control portion regulates the electric current which flows from the fuel cell into the charge-used voltage converter. Thereby, the electric power instantaneously taken out from the fuel cell is adjusted. As a result, the width of fluctuations in the charging-and-discharging power of the power storage device can be momentarily narrowed. Besides, using the fuel-supply setting processing portion, the quantity of a fuel supplied to the fuel cell by the fuel supply portion is set so that the power storage device's charging-and-discharging current is reduced. Thereby, the electric power taken out for a long time from the fuel cell is adjusted. As a result, the width of fluctuations in the charging-and-discharging power of the power storage device can be continuously narrowed. Therefore, in response to both instantaneous fluctuations and long-period fluctuations in the electric power of a load, the width of fluctuations in the charging-and-discharging power of the power storage device can be narrowed. This makes it possible to reduce the capacity of the power storage device and make the power storage device smaller.

Furthermore, it is preferable that the power supply apparatus further comprise: an electric-current detection portion which detects a charging-and-discharging current of the power storage device; a fuel supply portion which supplies a fuel to the fuel cell; and a fuel-supply setting processing portion which sets the quantity of a fuel supplied to the fuel cell by the fuel supply portion, based on a charging-and-discharging current detected by the electric-current detection portion, so that this charging-and-discharging current decreases.

According to this configuration, the quantity of a fuel supplied to the fuel cell by the fuel supply portion is set so that the power storage device's charging-and-discharging current is reduced. Thereby, the amount of electric power generated by the fuel cell is adjusted. Therefore, the width of fluctuations in the charging-and-discharging power of the power storage device can be narrowed. This makes it possible to reduce the capacity of the power storage device and make the power storage device smaller.

Moreover, preferably, the fuel-supply setting processing portion should: decrease the quantity of a fuel supplied to the fuel cell by the fuel supply portion if a charging-and-discharging current detected by the electric-current detection portion flows in the direction where the power storage device is charged; and increase the quantity of a fuel supplied to the fuel cell by the fuel supply portion if a charging-and-discharging current detected by the electric-current detection portion flows in the direction where the power storage device is discharged.

According to this configuration, the fuel-supply setting processing portion decreases the quantity of a fuel supplied to the fuel cell by the fuel supply portion, if the direction in which the charging-and-discharging current detected by the electric-current detection portion flows is identical with the direction in which the power storage device is charged, in other words, if the electric power charged from the charge-used voltage converter to the power storage device is greater than the electric power discharged from the power storage device to the output-used voltage converter. Thereby, the amount of electric power generated by the fuel cell is reduced. Thereby, the electric power which can be supplied from the power storage device to the charge-used voltage converter decreases. As a result, the electric power which the charge-used voltage converter can supply to the power storage device decreases, so that the power storage device's charging-and-discharging current can be reduced. In contrast, the fuel-supply setting processing portion increases the quantity of a fuel supplied to the fuel cell by the fuel supply portion, if the direction in which the charging-and-discharging current detected by the electric-current detection portion flows is identical with the direction in which electricity is discharged from the power storage device, in other words, if the electric power charged from the charge-used voltage converter to the power storage device is less than the electric power discharged from the power storage device to the output-used voltage converter. Thereby, the electric power which can be supplied from the power storage device to the charge-used voltage converter increases. As a result, the electric power which the charge-used voltage converter can supply to the power storage device increases, so that the power storage device's charging-and-discharging current can be reduced.

In addition, it is preferable that the power supply apparatus further comprise a setting portion which accepts a setting of the set output voltage. According to this configuration, the set voltage accepted by the setting portion is outputted as the set output voltage from the connection terminal to the load. Therefore, if a user sets the set output voltage using the setting portion, each kind of load which operates at a different power-supply voltage can be connected to the connection terminal of this power supply apparatus. This makes it possible to utilize various kinds of loads.

Furthermore, preferably, the power storage device should be a secondary battery. According to this configuration, an increase can be realized in the amount of electric power which is stored in the power storage device. This makes it easy to broaden the width of fluctuations in the electric current of a load which can be absorbed by the power storage device.

Moreover, the power storage device may also be a capacitor. According to this configuration, a capacitor has no such cycle life span as a secondary battery, so that the lifetime of this power supply apparatus can be easily lengthened.

By the way, to reduce the charging-and-discharging current means to bring its absolute value toward the direction of zero.

This application is based on Japanese patent application serial No. 2006-157613, filed in Japan Patent Office on Jun. 06, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power supply apparatus, comprising:
- a fuel cell;
- a power storage device which stores electric power;
- a connection terminal for connecting a load;
- a charge-used voltage converter which converts an output voltage of the fuel cell into a charging voltage for charging the power storage device and charges the power storage device; and
- an output-used voltage converter which converts an output voltage of the power storage device into a set output voltage determined in advance and outputs the set output voltage to the connection terminal;
- wherein the charge-used voltage converter includes: a voltage detection portion which detects an output voltage of the fuel cell; and a control portion which regulates an electric current sent from the fuel cell to the charge-used voltage converter so that the difference narrows between an output voltage of the fuel cell detected by the voltage detection portion and a reference voltage set in advance as a target value for an output voltage of the fuel cell.

2. The power supply apparatus according to claim 1, wherein the control portion: increases an electric current sent from the fuel cell to the charge-used voltage converter when an output voltage of the fuel cell detected by the voltage detection portion exceeds the reference voltage; and decreases an electric current sent from the fuel cell to the charge-used voltage converter when an output voltage of the fuel cell detected by the voltage detection portion does not reach the reference voltage.

3. The power supply apparatus according to claim 1, wherein the reference voltage is set to a voltage at which the fuel cell has the maximum power-generation efficiency.

4. The power supply apparatus according to claim 1, further comprising:
- an electric-current detection portion which detects a charging-and-discharging current of the power storage device; and
- a target-voltage setting processing portion which sets the reference voltage based on a charging-and-discharging current detected by the electric-current detection portion, so that this charging-and-discharging current decreases.

5. The power supply apparatus according to claim 4, wherein the target-voltage setting processing portion: heightens the reference voltage if a charging-and-discharging current detected by the electric-current detection portion flows in the direction where the power storage device is charged; and lowers the reference voltage if a charging-and-discharging current detected by the electric-current detection portion flows in the direction where the power storage device is discharged.

6. The power supply apparatus according to claim 1, further comprising:
- an electric-current detection portion which detects a charging-and-discharging current of the power storage device;
- a target-voltage setting processing portion which sets the reference voltage based on a charging-and-discharging current detected by the electric-current detection portion, so that this charging-and-discharging current decreases;
- a fuel supply portion which supplies a fuel to the fuel cell; and
- a fuel-supply setting processing portion which sets the quantity of a fuel supplied to the fuel cell by the fuel supply portion, based on a charging-and-discharging current detected by the electric-current detection portion, so that this charging-and-discharging current decreases.

7. A power supply apparatus, comprising:
- a fuel cell;
- a power storage device which stores electric power;
- a connection terminal for connecting a load;
- a charge-used voltage converter which converts an output voltage of the fuel cell into a charging voltage for charging the power storage device and charges the power storage device;
- an output-used voltage converter which converts an output voltage of the power storage device into a set output voltage determined in advance and outputs the set output voltage to the connection terminal;
- an electric-current detection portion which detects a charging-and-discharging current of the power storage device;
- a fuel supply portion which supplies a fuel to the fuel cell; and
- a fuel-supply setting processing portion which sets the quantity of a fuel supplied to the fuel cell by the fuel supply portion, based on a charging-and-discharging current detected by the electric-current detection portion, so that this charging-and-discharging current decreases;

wherein the fuel-supply setting processing portion: decreases the quantity of a fuel supplied to the fuel cell by the fuel supply portion if a charging-and-discharging current detected by the electric-current detection portion flows in the direction where the power storage device is charged; and increases the quantity of a fuel supplied to the fuel cell by the fuel supply portion if a charging-and-discharging current detected by the electric-current detection portion flows in the direction where the power storage device is discharged.

8. The power supply apparatus according to claim 1, further comprising a setting portion which accepts a setting of the set output voltage.

9. The power supply apparatus according to claim 1, wherein the power storage device is a secondary battery.

10. The power supply apparatus according to claim 1, wherein the power storage device is a capacitor.

11. The power supply apparatus according to claim 7, further comprising a setting portion which accepts a setting of the set output voltage.

12. The power supply apparatus according to claim 7, wherein the power storage device is a secondary battery.

13. The power supply apparatus according to claim 7, wherein the power storage device is a capacitor.

* * * * *